(12) United States Patent
Sohtell

(10) Patent No.: US 12,504,298 B2
(45) Date of Patent: Dec. 23, 2025

(54) RADAR SLAM FOR WATERCRAFT OPERATION INCLUDING AUTO DOCKING

(71) Applicant: Navico, Inc., Tulsa, OK (US)

(72) Inventor: Gustav Sohtell, Gothenburg (SE)

(73) Assignee: Navico, Inc., Tulsa, OK (US)

( * ) Notice: Subject to any disclaimer, the term of this patent is extended or adjusted under 35 U.S.C. 154(b) by 236 days.

(21) Appl. No.: 18/296,667

(22) Filed: Apr. 6, 2023

(65) Prior Publication Data
US 2024/0337505 A1 Oct. 10, 2024

(51) Int. Cl.
*G01C 21/00* (2006.01)
*B63B 49/00* (2006.01)
(Continued)

(52) U.S. Cl.
CPC .......... *G01C 21/3859* (2020.08); *B63B 49/00* (2013.01); *G01C 21/3848* (2020.08); *G01S 13/89* (2013.01); *G01S 13/937* (2020.01)

(58) Field of Classification Search
CPC ............ G01C 21/3859; G01C 21/3848; B63B 49/00; G01S 13/89; G01S 13/937; G01S 7/6281; G01S 15/89; G01S 13/862; G01S 15/88; G01S 15/8902; G01S 7/40; G01S 13/87
(Continued)

(56) References Cited

U.S. PATENT DOCUMENTS 7,036,445 B2 * 5/2006 Kaufmann ............ B63H 25/04
114/144 RE
2017/0365175 A1 * 12/2017 Harnett ................. B63H 20/14
(Continued)

FOREIGN PATENT DOCUMENTS

CA 3145943 A1 * 8/2022 ............ G01S 15/42
CN 103901806 * 7/2014
(Continued)

OTHER PUBLICATIONS

"GNSS reflectometry;" Wikipedia; retrieved Aug. 11, 2023 from https://en.wikipedia.org/wiki/GNSS_reflectometry.
(Continued)

*Primary Examiner* — Muhammad Shafi
(74) *Attorney, Agent, or Firm* — Nelson Mullins Riley & Scarborough LLP

(57) ABSTRACT

A method for forming updated map data and for using the updated map data to assist in docking the watercraft is provided. The method includes receiving first radar data from radar. First radar data is associated with a first coverage area. The method includes generating initial map data regarding features of the environment around the watercraft based on the first radar data. The method includes receiving second radar data associated with a location within the first coverage area from the radar. The first and second radar data are different. The method includes updating initial map data based on the second radar data to form updated map data and generating a docking operation using updated map data. The docking operation comprises causing presentation of a docking view illustrating a watercraft representation and a desired docking position and/or generating navigation instruction(s) for causing the watercraft to be repositioned.

17 Claims, 7 Drawing Sheets

(51) Int. Cl.
*G01S 13/89* (2006.01)
*G01S 13/937* (2020.01)

(58) Field of Classification Search
USPC .......................................................... 701/21
See application file for complete search history.

(56) References Cited

U.S. PATENT DOCUMENTS

| | | | |
|---|---|---|---|
| 2022/0197301 A1* | 6/2022 | Moawad | G01S 13/876 |
| 2022/0268585 A1* | 8/2022 | Tulgara | G01C 21/203 |
| 2023/0144543 A1* | 5/2023 | Dake | G01S 17/89 |
| | | | 701/450 |
| 2023/0150621 A1* | 5/2023 | Sohtell | H04W 84/12 |
| | | | 701/21 |

FOREIGN PATENT DOCUMENTS

| | | | |
|---|---|---|---|
| EP | 2604507 A2 * | 6/2013 | |
| WO | WO-2018201097 | * 11/2018 | |

OTHER PUBLICATIONS

"What is SLAM (Simultaneous Localization and Mapping);" *GeoSLAM*; retrieved Aug. 11, 2023 from https://geoslam.com/us/what-is-slam/.

* cited by examiner

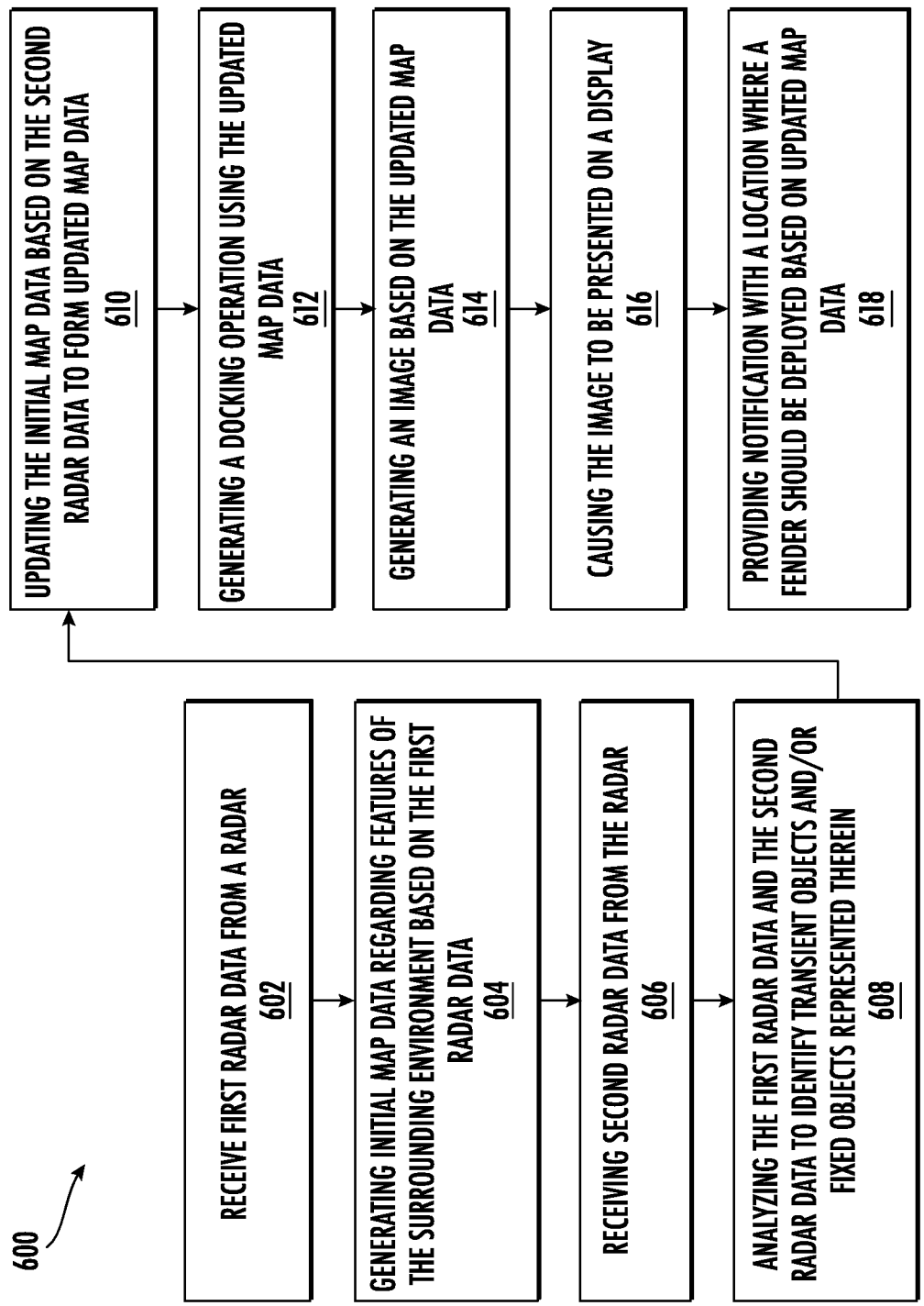

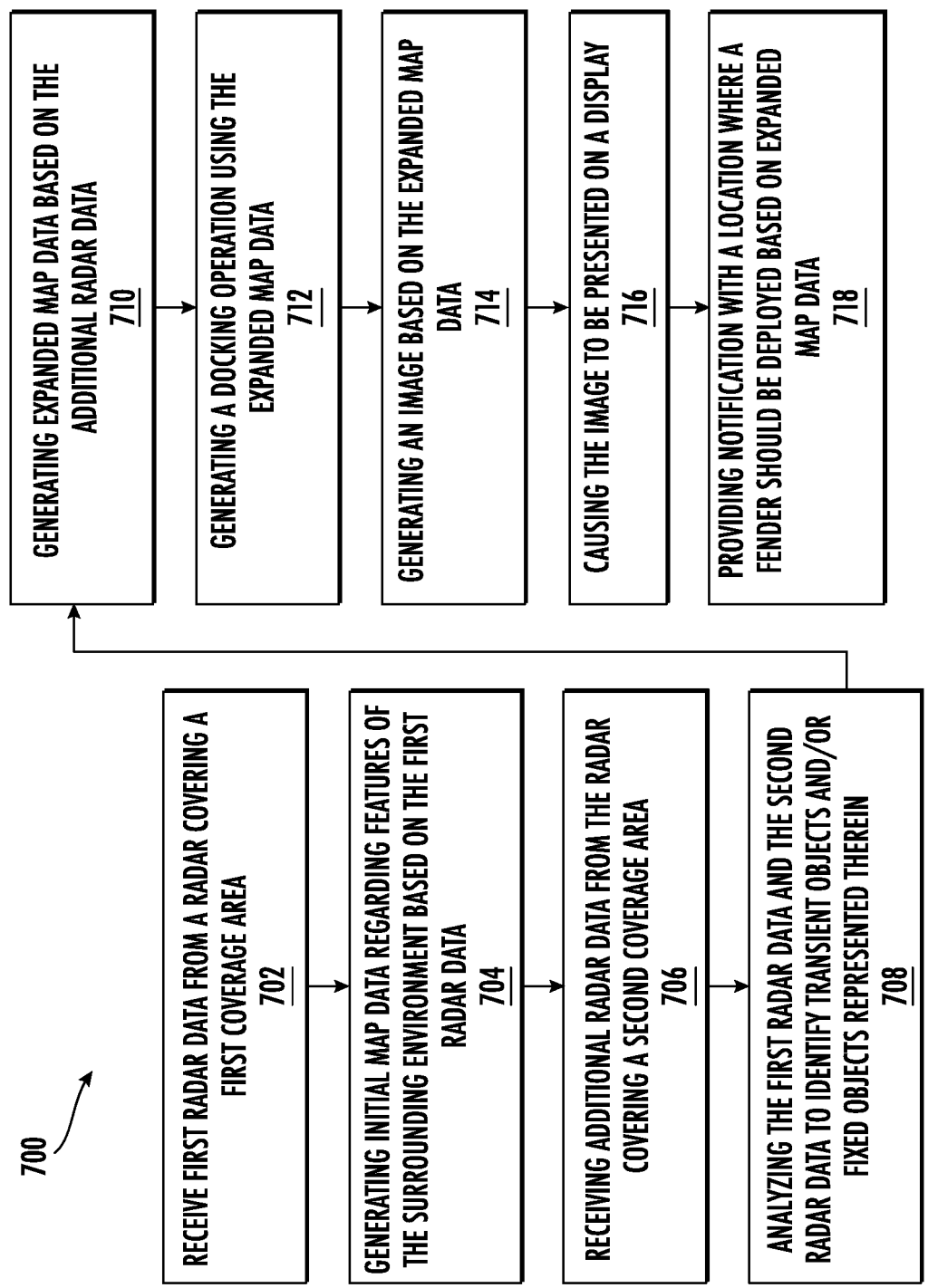

RADAR SLAM FOR WATERCRAFT OPERATION INCLUDING AUTO DOCKING

FIELD

Embodiments of the present invention relate generally to methods, systems, and apparatuses for forming updated map data regarding an environment around a watercraft and for using the updated map data to assist in operating the watercraft, such as during docking of the watercraft.

BACKGROUND OF THE INVENTION

Map data is often obtained for watercraft from sources such as global navigation satellite systems (GNSS). However, the accuracy and precision of data received from GNSS is often limited. Thus, where GNSS based map data is utilized, an object represented in map data may be positioned five to ten feet away from its actual location. Furthermore, in some areas, GNSS data may be unavailable such as in areas where there is limited satellite coverage or areas where satellite coverage is obscured by trees, bridges, or other objects overhead.

Additionally, where components on a watercraft are misaligned, the map data presented to a user may have limited accuracy. Misalignment may lead to an angular offset of map data from a correct angular orientation. For example, an object straight ahead of a watercraft may be presented in map data as being 3 degrees to the right of the watercraft's current direction. Misalignment may also lead to a position offset of map data from a correct position. For example, an object may be presented in map data at a location that is ten feet away from its actual location.

Where there are inaccuracies or limited precision in map data, this hinders watercraft operators as they attempt to navigate a watercraft. For example, a watercraft operator may attempt to navigate the watercraft, such as docking the watercraft, steering the watercraft, and/or anchoring at a specific position (such as a location where a large number of desirable fish are located). Inaccuracies or limited precision in map data may prevent the watercraft operator from accurately operating the watercraft according to the desired function, such as navigating around obstacles during docking or reaching an optimal position for catching the desired fish. Where inaccuracies or limited precision is present in map data, an increased risk is present that the operator may collide with other objects. In this regard, where map data possesses inaccuracies or limited precision, autonomous navigation poses potential safety risks.

BRIEF SUMMARY OF THE INVENTION

Embodiments of the present invention relate generally to methods, systems, and apparatuses for forming updated map data regarding a surrounding environment around a watercraft and for using the updated map data to assist in watercraft operation, such as docking the watercraft. Radar may be utilized to generate updated map data to obtain an accurate and precise depiction of the environment around a watercraft. Additionally, as the watercraft remains in a location for a lengthy period of time or as a watercraft moves through the same area multiple times, the updated map data may become more refined. As the watercraft moves within a body of water, the map data may be expanded to show additional locations.

Using Simultaneous Localization And Mapping (SLAM) techniques, the accuracy and precision of data received by a watercraft's radar may be improved. For example, using traditional radar processing techniques (e.g., only GNSS systems), an object represented in map data may be positioned five to ten feet away from its actual location, whereas using SLAM techniques, the object represented in map data may be more properly positioned less than a foot (or less) away from its actual location. SLAM techniques may also be beneficially used in some areas where GNSS signals are limited or unavailable, such as areas where trees, bridges, etc. are provided over water or in areas where limited satellite coverage is available.

In some embodiments, a docking operation may be generated using the updated map data. The docking operation may include causing presentation of a docking view, with the docking view illustrating a representation of the watercraft and a desired docking position on a display to aid the user during navigation. The docking operation may additionally or alternatively include the generation of navigation instruction(s) for causing the watercraft to be repositioned relative to the desired docking position (e.g., closer to and/or in the correct orientation), which may entail autonomously or semi-autonomously navigating the watercraft to the desired docking position using the navigation instruction(s) or providing instruction(s) on a display with the navigation instruction(s).

In some embodiments, map data may be updated by filtering data regarding certain objects out. The radar data may be analyzed to identify transient objects that are represented in the data, and data regarding transient object(s) may be filtered out of the updated map data so that the data regarding the transient object(s) are not included in the updated map data. Filtering of transient objects may be beneficial where a user wishes to locate generally stationary landmarks such as a coastline. The radar data may additionally or alternatively be analyzed to determine the size of an object, the speed of an object, a direction of an object, or a shape of an object, and this information may be used to filter certain objects out of updated map data. For example, where another watercraft is moving in a direction away from the user's watercraft, the data regarding the other watercraft may be filtered out of the display to further simplify the updated map data so that the data may be more easily understood by the user.

In an example embodiment, a method for forming updated map data regarding a surrounding environment around a watercraft and for using the updated map data to assist in docking the watercraft is provided. The method includes receiving first radar data from a radar on the watercraft. The first radar data is associated with a first coverage area. The method also includes generating initial map data regarding features of the surrounding environment around the watercraft based on the first radar data and receiving second radar data from the radar. The second radar data is different than the first radar data, and the second radar data includes radar data associated with a location within the first coverage area. The method also includes updating the initial map data based on the second radar data to form the updated map data and generating a docking operation using the updated map data. The docking operation comprises at least one of causing presentation of a docking view illustrating a representation of the watercraft and a desired docking position or generating one or more navigation instructions for causing the watercraft to be repositioned relative to the desired docking position.

In some embodiments, generating one or more navigation instructions for causing the watercraft to be repositioned relative to the desired docking position comprises at least one of autonomously or semi-autonomously navigating the watercraft to the desired docking position using the one or more navigation instructions or providing an instruction on a display with the one or more navigation instructions.

In some embodiments, the method also comprises analyzing the first radar data and the second radar data to identify transient objects that are represented therein, and updating the initial map data based on the second radar data to form the updated map data includes filtering data regarding a transient object out of the updated map data so that the data regarding the transient object is not included in the updated map data. Additionally, in some embodiments, filtering data is performed by accounting for at least one of a size of a transient object, a speed of the transient object, a direction of the transient object, or a shape of the transient object. Furthermore, in some embodiments, filtering data includes filtering data representing small transient objects that have a size that is smaller than a threshold, and the updated map data includes data representing the fixed objects and large transient objects that have a size that is greater than or equal to the threshold. In some embodiments, updating the initial map data based on the second radar data to form the updated map data includes filtering data regarding all transient objects out so that the data regarding the transient objects is not included in the updated map data.

In some embodiments, the method also includes analyzing the first radar data and the second radar data to identify fixed objects that are represented therein, and the updated map data includes only data from the first radar data and the second radar data regarding the fixed objects.

In some embodiments, the method also includes generating an image based on the updated map data, and causing the image to be presented on a display.

In some embodiments, the first radar data is received at a first time, and the second radar data is received at a second time that is after the first time. Furthermore, in some embodiments, the updated map data is updated by utilizing the second radar data at locations where the second radar data is available rather than utilizing the first radar data. Additionally, in some embodiments, the updated map data is updated by utilizing both the first radar data and the second radar data in locations where both first radar data and second radar data are available.

In some embodiments, the method also comprises receiving additional radar data from the radar, with additional radar data covering a second coverage area and with the second coverage area covering one or more locations outside of the first coverage area. The method also comprises generating expanded map data based on the additional radar data, and generating the docking operation using the expanded map data. In some embodiments, the docking operation is generated using the updated map data and additional data regarding at least one of a water current, a wind speed, a water temperature, an air temperature, or wave roughness. In some embodiments, the method includes providing a notification with a location where a fender should be deployed based on the updated map data. In some embodiments, the radar is configured to provide radar data for locations provided within a radius of at least five feet from the radar.

In another example embodiment, a non-transitory computer readable medium having stored thereon software instructions is provided. The software instructions, when executed by a processor, cause the processor to form updated map data regarding a surrounding environment around a watercraft and to use the updated map data to assist in docking the watercraft. This is caused by receiving first radar data from a radar on the watercraft, with the first radar data being associated with a first coverage area. This is also caused by generating initial map data regarding features of the surrounding environment around the watercraft based on the first radar data and receiving second radar data from the radar. The second radar data is different than the first radar data, and the second radar data includes radar data associated with a location within the first coverage area. Additionally, software instructions cause the processor to form updated map data regarding a surrounding environment around a watercraft and to use the updated map data to assist in docking the watercraft by updating the initial map data based on the second radar data to form updated map data and by generating a docking operation using the updated map data. The docking operation comprises at least one of causing presentation of a docking view illustrating a representation of the watercraft and a desired docking position or generating one or more navigation instructions for causing the watercraft to be repositioned relative to the desired docking position.

In some embodiments, generating one or more navigation instructions for causing the watercraft to be repositioned proximate to the desired docking position includes at least one of autonomously or semi-autonomously navigating the watercraft to the desired docking position using the one or more navigation instructions or providing an instruction on a display with the one or more navigation instructions.

In some embodiments, the software instructions, when executed by the processor, cause the processor to analyze the first radar data and the second radar data to identify transient objects that are represented therein, and updating the initial map data based on the second radar data to form updated map data includes filtering data regarding a transient object out of the updated map data so that the data regarding the transient object is not included in the updated map data. In some embodiments, the first radar data is received at a first time, and the second radar data is received at a second time that is after the first time.

In another example embodiment, a system for creation of updated map data regarding a surrounding environment around a watercraft and for use of the updated map data to assist in docking the watercraft is provided. The system comprises a radar, a processor, and a memory including computer program code. The computer program code is configured to, when executed, cause the processor to receive first radar data from the radar on the watercraft, with the first radar data being associated with a first coverage area. The computer program code is configured to, when executed, cause the processor to generate initial map data regarding features of the surrounding environment around the watercraft based on the first radar data and receive second radar data from the radar. The second radar data is different than the first radar data, and the second radar data includes radar data associated with a location within the first coverage area. The computer program code is also configured to, when executed, cause the processor to update the initial map data based on the second radar data to form updated map data and generate a docking operation using the updated map data. The docking operation comprises at least one of causing presentation of a docking view illustrating a representation of the watercraft and a desired docking position or generating one or more navigation instructions for causing the watercraft to be repositioned relative to the desired docking position.

BRIEF DESCRIPTION OF THE DRAWINGS

Figure 1A:
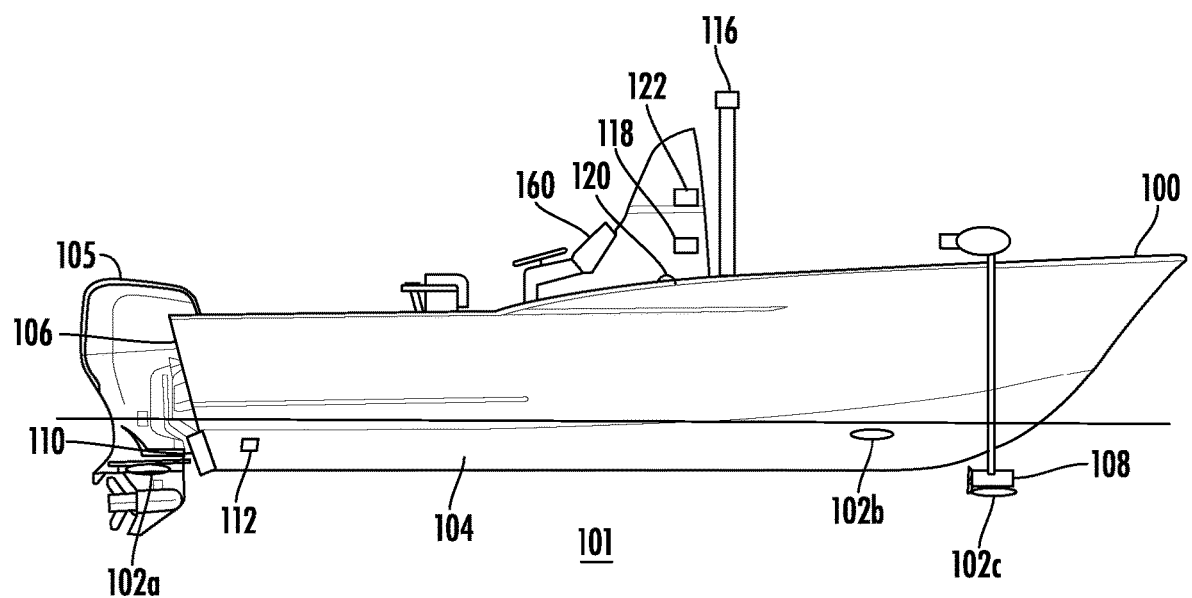
Figure 1B:
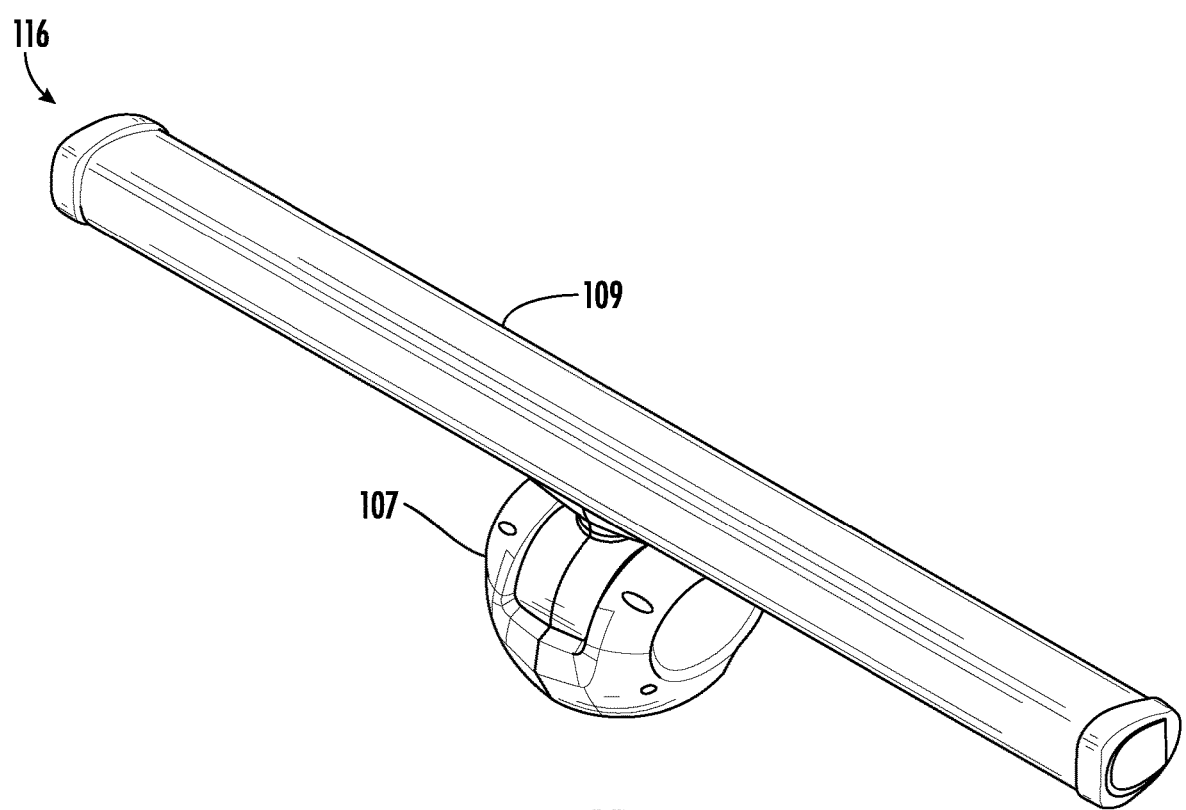
Figure 2:
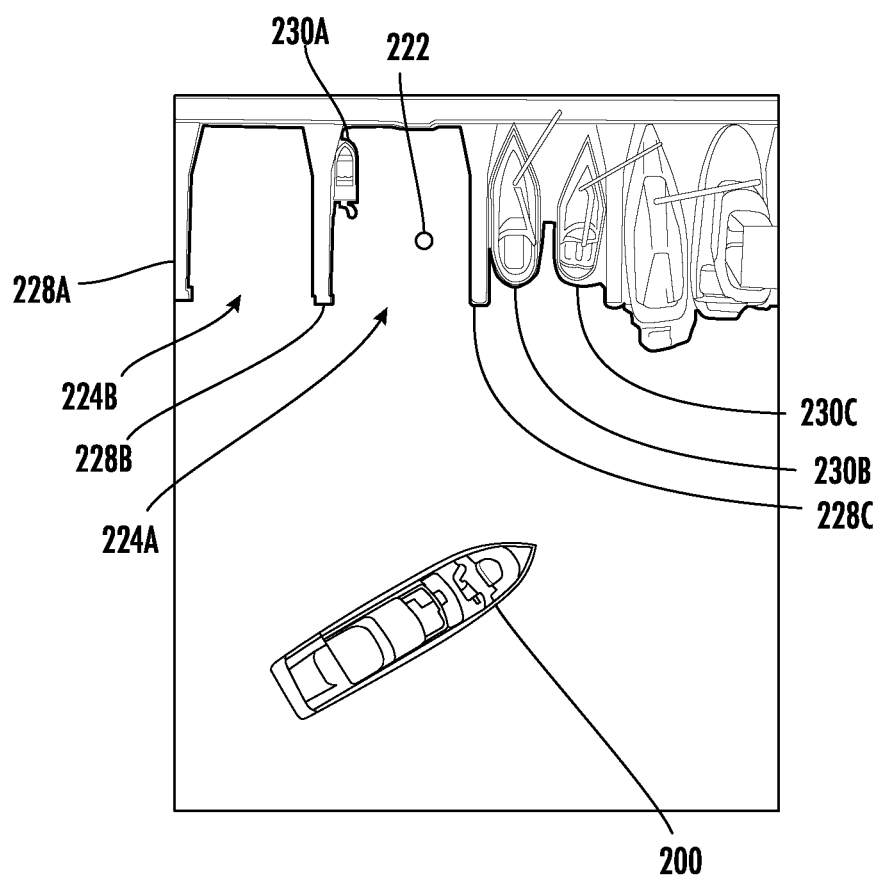
Figure 3:
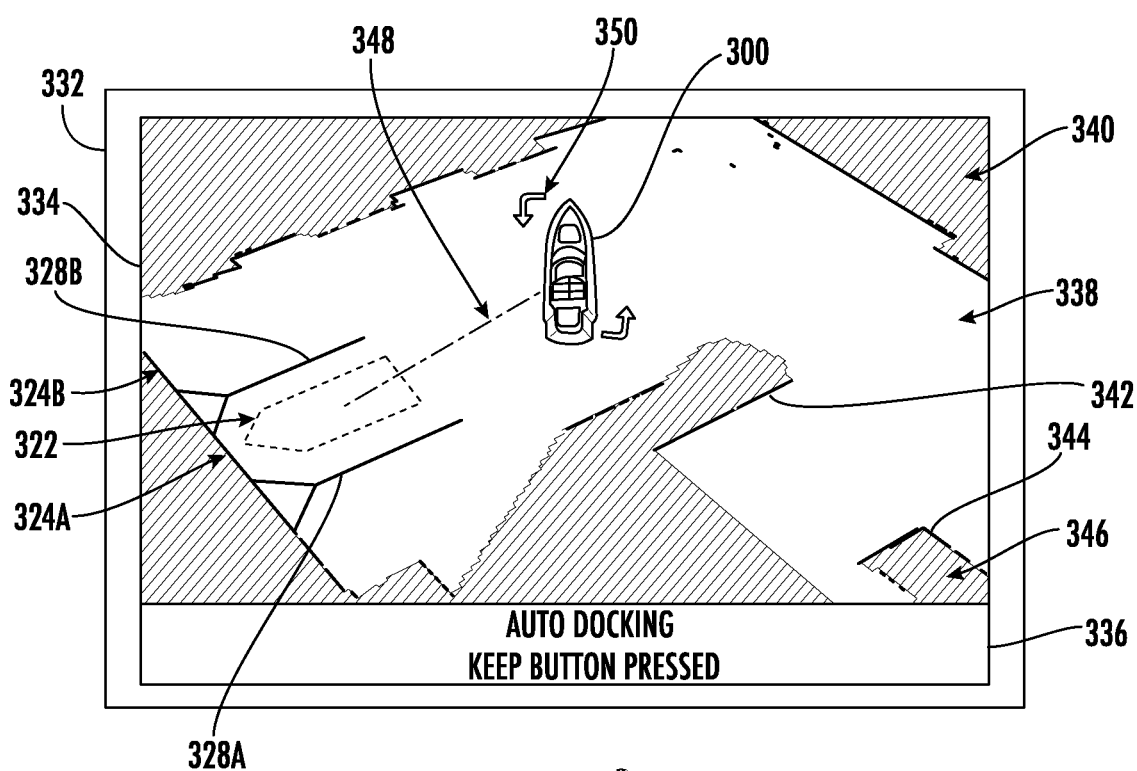
Figure 4:
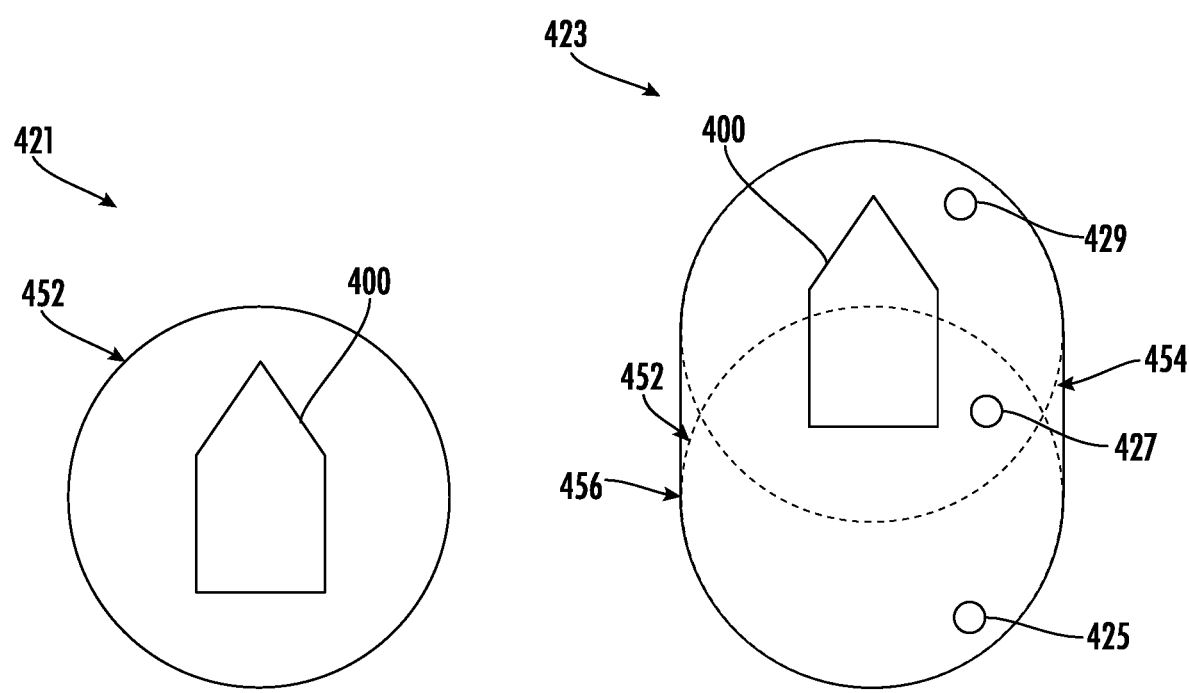
Figure 5:
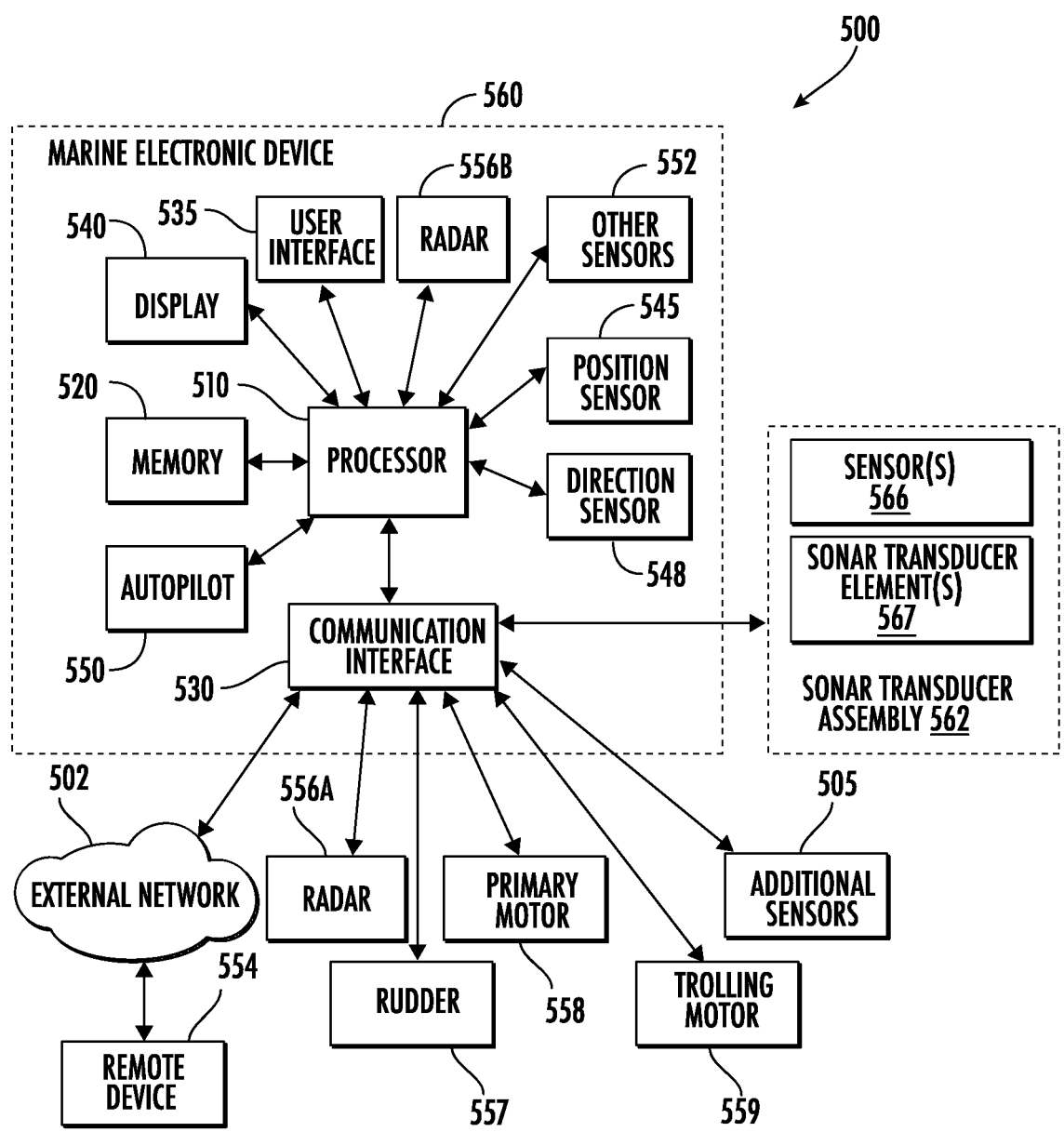

Having thus described the invention in general terms, reference will now be made to the accompanying drawings, which are not necessarily drawn to scale, and wherein:

FIG. 1A is a schematic view illustrating an example watercraft including various marine devices, in accordance with some embodiments discussed herein;

FIG. 1B is a perspective view illustrating an example radar, in accordance with some embodiments discussed herein;

FIG. 2 is a top view illustrating an example watercraft navigating to a desired docking position, in accordance with some embodiments discussed herein;

FIG. 3 is a schematic view illustrating an example screen presented on an example display, in accordance with some embodiments discussed herein;

FIG. 4 is a schematic view illustrating expanded map data being created as a watercraft moves from a first position to a second position, in accordance with some embodiments discussed herein;

FIG. 5 is a block diagram illustrating system components utilized in various embodiments discussed herein;

FIG. 6 is a flowchart illustrating an example method for forming updated map data regarding a surrounding environment around a watercraft and for using the updated map data to assist in docking the watercraft, in accordance with some embodiments discussed herein; and FIG. 7 is a flowchart illustrating another example method for forming updated map data regarding a surrounding environment around a watercraft and for using the updated map data to assist in docking the watercraft, in accordance with some embodiments discussed herein.

DETAILED DESCRIPTION

Example embodiments of the present invention now will be described more fully hereinafter with reference to the accompanying drawings, in which some, but not all embodiments of the invention are shown. Indeed, the invention may be embodied in many different forms and should not be construed as limited to the example embodiments set forth herein; rather, these embodiments are provided so that this disclosure will satisfy applicable legal requirements. Any connections or attachments may be direct or indirect connections or attachments unless specifically noted otherwise.

FIG. 1A is a schematic view illustrating an example watercraft including various marine devices. As illustrated in FIG. 1A, the watercraft 100 (e.g., a vessel) is configured to traverse a marine environment, e.g. body of water 101. Notably, example watercraft contemplated herein may be surface watercraft, submersible watercraft, or any other implementation known to those skilled in the art.

Depending on the configuration, the watercraft 100 may include a primary motor 105, which may be a main propulsion motor such as an outboard or inboard motor. Additionally, the watercraft 100 may include a trolling motor 108 configured to propel the watercraft 100 or, for example, maintain a position.

The watercraft 100 may include a marine electronic device 160, such as may be utilized by a user to interact with, view, or otherwise control various functionality regarding the watercraft, including, for example, nautical charts and various radar systems described herein. In the illustrated embodiment, the marine electronic device 160 is positioned proximate the helm (e.g., steering wheel) of the watercraft 100—although other places on the watercraft 100 are contemplated. Likewise, additionally or alternatively, a remote device (such as a user's mobile device) may include functionality of a marine electronic device.

The watercraft 100 may also comprise other components within the marine electronic device 160, at the helm, or otherwise positioned. In FIG. 1A, the watercraft 100 comprises a radar 116, which is mounted at an elevated position (although other positions relative to the watercraft are also contemplated). Radar (RAdio Detection And Ranging) uses radio waves to determine the distance, angle, and radial velocity of objects relative to the watercraft. A radar system typically includes an antenna, a transmitter that emits electromagnetic waves corresponding to radar signals, a receiver for receiving radar return signals (the radar signals that reflect off objects and return to the antenna), and a processor to process the radar return signals. The processed radar return signals can be formed into radar image data that is presented on a display device of the watercraft, often as an image type known as plan position indicator (PPI), although other image types can be formed (such as described herein).

The watercraft 100 may also include one or more sonar transducer assemblies 102a, 102b, and 102c disposed on and/or proximate to the watercraft 100. The sonar transducer assemblies 102a, 102b, and 102c may each include one or more transducer elements configured to transmit sound waves into a body of water, receive sonar returns from the body of water, and convert the sonar returns into sonar return data. Various types of sonar transducers may be utilized—for example, a linear downscan sonar transducer, a conical downscan sonar transducer, a sidescan sonar transducer, and/or one or more arrays of a plurality of sonar transducer elements. The one or more sonar transducer assemblies (e.g., 102a, 102b, and/or 102c) may be mounted in various positions and to various portions of the watercraft 100 and/or equipment associated with the watercraft 100. For example, the sonar transducer assembly may be mounted to the transom 106 of the watercraft 100, such as depicted by sonar transducer assembly 102a. The sonar transducer assembly may be mounted to the bottom or side of the hull 104 of the watercraft 100, such as depicted by sonar transducer assembly 102b. The sonar transducer assembly may be mounted to the trolling motor 108, such as depicted by sonar transducer assembly 102c. Other mounting configurations are contemplated also, such as may enable rotation of the sonar transducer assembly (e.g., mechanical and/or manual rotation, such as on a rod or other mounting connection).

The watercraft 100 may also comprise an AIS transceiver 118, a direction sensor 120, and a camera 122, and these components are each positioned at or near the helm (although other positions relative to the watercraft 100 are also contemplated). Additionally, the watercraft 100 may comprise a rudder 110 at the stern of the watercraft 100, and the rudder 110 is positioned on the watercraft 100 so that the rudder 110 will rest in the body of water 101.

Another example device on the watercraft 100 includes a temperature sensor 112 that may be positioned so that it will either rest within or outside of the body of water 101. Other example devices include a wind sensor, one or more speakers, and various vessel devices/features (e.g., doors, bilge pump, fuel tank, etc.), among other things. Additionally, one or more sensors may be associated with marine devices; for example, a sensor may be provided to detect the position of the primary motor 105, the trolling motor 108, or the rudder 110. In some embodiments, some of these components may be integrated into the marine electronic device 160 or other devices.

An example radar is illustrated in the perspective view of FIG. 1B. The radar 116 may include a housing 107 and an antenna 109. In some embodiments, this antenna 109 may be configured to rotate relative to the housing 107 of the radar device 116. The antenna 109 may be connected to a rotary joint in the housing 107. A channel within the housing 107 may be configured to transfer radio-frequency power to or from the antenna 109. The radar 116 may include one or more processors and associated memory within the housing 107. The radar 116 may be configured to emit radio waves from the antenna 109, and some of the energy from the radio waves is reflected back to the radar 116 so that data may be obtained. While a rotating antenna assembly is shown as the example radar 116 in FIG. 1B, any type of radar is contemplated by embodiments of the present invention.

As a watercraft navigates in a body of water, the watercraft may have various objects that serve as obstacles as the watercraft moves, such as to a desired docking position, and radar data may be used to accurately map various objects. FIG. 2 is a top view illustrating an example watercraft 200 navigating to a desired docking position 222. Various docks extend out into the body of water. For example, FIG. 2 illustrates a first dock 228A, a second dock 228B, a third dock 228C, and other additional docks. Various slots may be provided between these docks. For example, a first slot 224A is positioned between the second dock 228B and the third dock 228C, and a second slot 224B is positioned between the first dock 228A and the second dock 228B. Various watercraft may be provided in the environment surrounding the watercraft 200. For example, a first watercraft 230A, a second watercraft 230B, a third watercraft 230C, and other watercraft are illustrated in FIG. 2. Each of these watercraft are illustrated in slots between the docks, but the watercraft may be provided at other locations in the environment surrounding the watercraft 200. As the watercraft 200 is docking, the watercraft, docks, and other objects should be accounted for to avoid collisions.

Maps may be created of an area with only a single pass through the area in some embodiments. However, as multiple passes are made in an area, the maps formed for that area may be refined further so that the accuracy of the maps are improved in those areas. Furthermore, multiple passes may be beneficial to effectively identify whether objects in the environment are fixed or transient. In some cases, objects in the environment may be identified as fixed or transient as the watercraft makes only a single pass through an area, and deviations in the position of transitory objects in different frames may be identified by comparing the changes in relative position of the transitory objects relative to other objects in the data.

Loop closure may be utilized to recognize when a watercraft returns to a previous area that has already been mapped using SLAM techniques. The use of loop closure can be beneficial to help reduce the amount of cumulative error in mapping. To the extent that sensors or other equipment are not calibrated perfectly, the maps that are generated may be slightly distorted. Even if there are only small errors in the sensors or the other equipment, this may have a large cumulative effect as several frames are obtained. With loop closure, this distortion may be identified and removed. For example, a watercraft may identify a fixed object at a first time when the watercraft is in an area, the watercraft may navigate through the environment, and then the watercraft may return to the area in close proximity to the fixed object. Loop closure may identify the fixed object, and changes in the position of the fixed object may be indicative of distortion. By removing this distortion, the accuracy of the generated maps may be improved.

SLAM techniques may be provided to map a watercraft environment. As the watercraft moves into unknown environments, the SLAM techniques may construct and/or update the map, and the watercraft may be localized within the created map. In various embodiments, the SLAM techniques may be implemented with radar data, but SLAM techniques may be used with other types of data such as sonar data. SLAM techniques may also be implemented using visual SLAM (vSLAM), where images are used that are obtained from cameras or other visual sensors. SLAM techniques may be implemented using Light Detection And Ranging (LiDAR) SLAM, where data is obtained from a laser sensor or a distance sensor. In some embodiments, SLAM may be used to provide two-dimensional data or three-dimensional data for construction of maps.

SLAM may use feature matching to identify critical points of the environment such as corners of objects, edges of objects, etc. SLAM may also use pose estimation to identify how the critical points of the environment have moved from one frame to the next frame. For example, in a basic scenario where a watercraft moves in a straight line and all other surrounding objects in the environment remain stationary, the critical points of the environment may generally shift by some identical amount. Where a watercraft is actively rotating between frames, the critical points in the environment may shift in variable amounts. Pose estimation may also be used to detect transient objects in some embodiments.

Once maps are formed using SLAM mapping techniques, loop closure may be utilized to recognize when a watercraft returns to a previous area that has already been mapped using SLAM techniques. In some embodiments, loop closure may be utilized to match up consistencies in the features that have been identified in feature matching. Path planning may be utilized alongside the maps created through SLAM techniques to find an optimal path from the current location of a watercraft to a desired destination of the watercraft. A path following algorithm may be utilized to cause the watercraft to navigate along a path. In some embodiments, path following algorithms may allow a watercraft to deviate from a path when transient objects or other objects appear in the path of the watercraft, and the path following algorithms may facilitate the return of the watercraft to the path once the watercraft has passed an obstacle in the path.

In some embodiments, updated map data may be provided on a screen of a display, and, in some embodiments, the display may also include features to assist in docking a watercraft either automatically or manually. FIG. 3 is a schematic view illustrating an example screen 334 presented on an example display 332. On the screen 334, a representation of a watercraft 300 of a user is illustrated. The screen 334 illustrates the environment surrounding the watercraft, and the screen 334 may be generated using radar data from a radar 116 (see FIGS. 1A-1B). The environment represented in FIG. 3 is generally similar to the environment illustrated in FIG. 2. A first dock 328A and a second dock 328B are represented on the screen 334, and a first slot 324A and a second slot 324B are also represented on the screen 334.

In the illustrated embodiment, the watercraft that is represented by representation 300 has the desired docking position 322 in the first slot 324A. In navigating the watercraft, the watercraft must navigate around various objects in the surrounding environment. These objects include the first object 342, the second object 344, the first dock 328A, and the second dock 328B. Other objects may also exist such as animals, people within the body of water, buoys, signs, etc. The first object 342 and the second object 344 may be other watercraft that are moving in the water.

In the illustrated embodiment, the screen shows an expanded coverage area 338. In some embodiments, this expanded coverage area 338 may generally include areas proximate to recent positions of the watercraft that fall within the radius of coverage for a radar on the watercraft. Various uncovered areas are illustrated in FIG. 3. For example, a first uncovered area 340 and a second uncovered area 346 are each illustrated. These uncovered areas may fall outside of a radius of coverage for the radar on the watercraft (and/or this specific operation) as the watercraft moves around. Uncovered areas may also be formed where radar coverage is occluded due to the presence of other objects.

In some embodiments, data may be received from a remote device 554 (see FIG. 5) via an external network 502 (see FIG. 5), and this data may be from other watercraft that have recently navigated in the area. The data from the other watercraft may be utilized to further expand the coverage area or to provide more data points for areas so that the coverage area may be refined.

In some embodiments, a docking operation may be generated using the updated map data. The docking operation may include causing presentation of a docking view illustrating a representation 300 of the watercraft and a desired docking position 322, such as illustrated in FIG. 3. In FIG. 3, a vector 348 is also provided that extends from the center of the representation 300 of the watercraft to the desired docking position 322. Symbols 350 are also provided to indicate that rotation of the watercraft is necessary to reach the desired docking position 322. In some embodiments, the docking operation may include generating one or more navigation instructions for causing the watercraft to be repositioned proximate to the desired docking position. For example, the navigation instructions may be to rotate the watercraft by some defined angle and/or to travel some distance in that direction. In other embodiments, the navigation instructions may be more refined to account for more complex routes. For example, more complex routes may be beneficial to avoid fixed or transient objects that are represented in the updated map data. Also, more complex routes may be beneficial to permit a watercraft operator to travel to certain specified waypoints as the watercraft travels to the desired docking position 322.

In some embodiments, the navigation instructions may be utilized to autonomously or semi-autonomously navigate the watercraft to the desired docking position using the one or more navigation instructions. In the illustrated embodiment, a notification 336 is provided on the screen 334 to indicate to the user that an auto docking process is underway and that the user should keep the button pressed, with the button being a button associated with auto docking. The button may be provided in a user interface 535 (see FIG. 5) of a marine electronic device 560 (see FIG. 5) in some embodiments. In some embodiments, the navigation instructions may be utilized to provide an instruction on a display with the one or more navigation instructions.

In some embodiments, expanded map data may be created using techniques described herein as a watercraft moves in a body of water. FIG. 4 is a schematic view illustrating expanded map data being created as a watercraft 400 moves from a first position to a second position. In the first schematic 421 on the left in FIG. 4, a watercraft 400 is provided in a first position, and the radar 116 (see FIGS. 1A-1B) on the watercraft 400 has a first coverage area 452 when the watercraft 400 is located at this first position. The coverage area of the radar 116 may have a radius of at least five feet in some embodiments. In some embodiments, the coverage area may have a radius of at least twenty feet, although other radius's and coverage areas are contemplated and may, in some embodiments, depend on the configuration of the radar associated with the watercraft.

In the second schematic 423 on the right in FIG. 4, the watercraft 400 is provided in a second position. The radar 116 (see FIGS. 1A-1B) on the watercraft 400 has a second coverage area 454 when the watercraft 400 is located at this second position. As the watercraft moves from the first position to the second position, expanded map data may be obtained for an expanded coverage area 456, and the expanded map data may include data from the first coverage area and the second coverage area. In some embodiments, the expanded map data may also include data from coverage areas for intermediate positions between the first position and the second position so that the expanded map data has the expanded coverage area 456.

The expanded coverage area 456 may cover various locations. The expanded coverage area 456 may include locations that are only within the first coverage area 452 (and not within the second coverage area 454) such as the first location 425. Additionally, the expanded coverage area 456 may include locations that are covered by both the first coverage area 452 and the second coverage area 454 such as the second location 427. Furthermore, the expanded coverage area 456 may include locations that are only within the second coverage area 454 (and not within the first coverage area 452) such as the third location 429.

The watercraft may have systems thereon including various electrical components, and FIG. 5 is a block diagram illustrating electrical components that may be provided and utilized with various systems and watercraft described herein. The system 500 may comprise numerous marine devices. As shown in FIG. 5, a sonar transducer assembly 562, a radar 556A, a rudder 557, a primary motor 558, a trolling motor 559, and additional sensors/devices 505 may be provided as marine devices, but other marine devices may also be provided. One or more marine devices may be implemented on the marine electronic device 560 as well. For example, a position sensor 545, a direction sensor 548, an autopilot 550, and other sensors/devices 552 may be provided within the marine electronic device 560. These marine devices can be integrated within the marine electronic device 560, integrated on a watercraft at another location and connected to the marine electronic device 560, and/or the marine devices may be implemented at a remote device 554 in some embodiments. The system 500 may include any number of different systems, modules, or components; each of which may comprise any device or means embodied in either hardware, software, or a combination of hardware and software configured to perform one or more corresponding functions described herein.

The marine electronic device 560 may include at least one processor 510, a memory 520, a communication interface 530, a user interface 535, a display 540, autopilot 550, and one or more sensors (e.g. position sensor 545, direction sensor 548, other sensors/devices 552). One or more of the components of the marine electronic device 560 may be located within a housing or could be separated into multiple different housings (e.g., be remotely located).

The processor(s) 510 may be any means configured to execute various programmed operations or instructions stored in a memory device (e.g., memory 520) such as a device or circuitry operating in accordance with software or otherwise embodied in hardware or a combination of hardware and software (e.g. a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processor(s) 510 as described herein. In this regard, the processor(s) 510 may be configured to analyze electrical signals communicated thereto to provide or receive radar data from one or more radar devices and additional (e.g., secondary) data from other sources. For example, the processor(s) 510 may be configured to receive radar data and additional data, determine an expected position, velocity (if any), an object type for an object, and/or determine a corrective action based on the deviation. In some embodiments, the processor(s) 510 may be further configured to implement signal processing.

In an example embodiment, the memory 520 may include one or more non-transitory storage or memory devices such as, for example, volatile and/or non-volatile memory that may be either fixed or removable. The memory 520 may be configured to store instructions, computer program code, radar data, and additional data such as sonar data, chart data, location/position data in a non-transitory computer readable medium for use, such as by the processor(s) 510 for enabling the marine electronic device 560 to carry out various functions in accordance with example embodiments of the present invention. For example, the memory 520 could be configured to buffer input data for processing by the processor(s) 510. Additionally or alternatively, the memory 520 could be configured to store instructions for execution by the processor(s) 510. The memory 520 may include computer program code that is configured to, when executed, cause the processor(s) 510 to perform various methods described herein. The memory 520 may serve as a non-transitory computer readable medium having stored thereon software instructions that, when executed by a processor, cause methods described herein to be performed.

The communication interface 530 may be configured to enable communication to external systems (e.g. an external network 502). In this manner, the marine electronic device 560 may retrieve stored data from a remote device 554 via the external network 502 in addition to or as an alternative to the onboard memory 520. Additionally or alternatively, the marine electronic device 560 may transmit or receive data, such as radar signal data, radar return data, radar image data, path data or the like to or from a sonar transducer assembly 562. In some embodiments, the marine electronic device 560 may also be configured to communicate with other devices or systems (such as through the external network 502 or through other communication networks, such as described herein). For example, the marine electronic device 560 may communicate with a propulsion system of the watercraft 100 (e.g., for autopilot control); a remote device (e.g., a user's mobile device, a handheld remote, etc.); or another system.

The communications interface 530 of the marine electronic device 560 may also include one or more communications modules configured to communicate with one another in any of a number of different manners including, for example, via a network. In this regard, the communications interface 530 may include any of a number of different communication backbones or frameworks including, for example, Ethernet, the NMEA 2000 framework, GPS, cellular, Wi-Fi, or other suitable networks. The network may also support other data sources, including GPS, autopilot, engine data, compass, radar, etc. In this regard, numerous other peripheral devices (including other marine electronic devices or transducer assemblies) may be included in the system 500.

The position sensor 545 may be configured to determine the current position and/or location of the marine electronic device 560 (and/or the watercraft 100). For example, the position sensor 545 may comprise a GPS, bottom contour, inertial navigation system, such as machined electromagnetic sensor (MEMS), a ring laser gyroscope, or other location detection system. Alternatively or in addition to determining the location of the marine electronic device 560 or the watercraft 100, the position sensor 545 may also be configured to determine the position and/or orientation of an object outside of the watercraft 100.

The display 540 (e.g. one or more screens) may be configured to present images and may include or otherwise be in communication with a user interface 535 configured to receive input from a user. The display 540 may be, for example, a conventional LCD (liquid crystal display), a touch screen display, mobile device, or any other suitable display known in the art upon which images may be displayed.

In some embodiments, the display 540 may present one or more sets of data (or images generated from the one or more sets of data). Such data includes chart data, radar data, sonar data, weather data, location data, position data, orientation data, sonar data, or any other type of information relevant to the watercraft. Radar data may be received from radar 556A located outside of a marine electronic device 560, radar 556B located in a marine electronic device 560, or from radar devices positioned at other locations, such as remote from the watercraft. Additional data may be received from marine devices such as a sonar transducer assembly 562, a primary motor 558 or an associated sensor, a trolling motor 559 or an associated sensor, an autopilot 550, a rudder 557 or an associated sensor, a position sensor 545, a direction sensor 548, other sensors/devices 552, a remote device 554, onboard memory 520 (e.g., stored chart data, historical data, etc.), or other devices.

The user interface 535 may include, for example, a keyboard, keypad, function keys, buttons, a mouse, a scrolling device, input/output ports, a touch screen, or any other mechanism by which a user may interface with the system.

Although the display 540 of FIG. 5 is shown as being directly connected to the processor(s) 510 and within the marine electronic device 560, the display 540 could alternatively be remote from the processor(s) 510 and/or marine electronic device 560. Likewise, in some embodiments, the position sensor 545 and/or user interface 535 could be remote from the marine electronic device 560.

The marine electronic device 560 may include one or more other sensors/devices 552, such as configured to measure or sense various other conditions. The other sensors/devices 552 may include, for example, an air temperature sensor, a water temperature sensor, a current sensor, a light sensor, a wind sensor, a speed sensor, or the like.

A sonar transducer assembly 562 is also provided in the system 500. The sonar transducer assembly 562 illustrated in FIG. 5 may include one or more sonar transducer elements 567, such as may be arranged to operate alone or in one or more transducer arrays. In some embodiments, additional separate sonar transducer elements (arranged to operate alone, in an array, or otherwise) may be included. As indicated herein, the sonar transducer assembly 562 may also include a sonar signal processor or other processor (although not shown) configured to perform various sonar processing. In some embodiments, the processor (e.g., processor(s) 510 in the marine electronic device 560, a controller (or processor portion) in the sonar transducer assembly 562, or a remote controller—or combinations thereof)

may be configured to filter sonar return data and/or selectively control sonar transducer element(s) 567. For example, various processing devices (e.g., a multiplexer, a spectrum analyzer, A-to-D converter, etc.) may be utilized in controlling or filtering sonar return data and/or transmission of sonar signals from the sonar transducer element(s) 567. The processor(s) 510 may also be configured to filter data regarding certain objects out of map data.

The sonar transducer assembly 562 may also include one or more other systems, such as various sensor(s) 566. For example, the sonar transducer assembly 562 may include an orientation sensor, such as gyroscope or other orientation sensor (e.g., accelerometer, MEMS, etc.) that can be configured to determine the relative orientation of the sonar transducer assembly 562 and/or the one or more sonar transducer element(s) 567—such as with respect to a forward direction of the watercraft. In some embodiments, additionally or alternatively, other types of sensor(s) are contemplated, such as, for example, a water temperature sensor, a current sensor, a light sensor, a wind sensor, a speed sensor, or the like. While only one sonar transducer assembly 562 is illustrated in FIG. 5, additional sonar transducer assemblies may be provided in other embodiments.

The components presented in FIG. 5 may be rearranged to alter the connections between components. For example, in some embodiments, a marine device outside of the marine electronic device 560, such as the radar 556A, may be directly connected to the processor(s) 510 rather than being connected to the communication interface 530. Additionally, sensors and devices implemented within the marine electronic device 560 may be directly connected to the communications interface in some embodiments rather than being directly connected to the processor(s) 510.

Example Flowchart(s)

Embodiments of the present invention provide methods, apparatus and computer program products for operating a sonar system according to various embodiments described herein. Various methods are contemplated for forming updated map data regarding a surrounding environment around a watercraft and for using the updated map data to assist in various operations, such as docking the watercraft. Various examples of the operations performed in accordance with embodiments of the present invention will now be provided with reference to FIG. 6-7.

At operation 602, first radar data is received from a radar. The radar may be located on the watercraft, with the radar located at the marine electronic device 560 (see FIG. 5) of the watercraft or at some other location. Additionally, the first radar data is associated with a first coverage area around the watercraft. The radar may be configured to provide radar data for locations provided within a radius, such as within at least five feet, from the radar. In some embodiments, the radar may be configured to provide radar data for locations provided within a radius of at least twenty feet from the radar, at least fifty feet from the radar, or other distances. At operation 604, initial map data is generated regarding features of the surrounding environment around a watercraft based on the first radar data.

At operation 606, second radar data is received from the radar. The second radar data includes radar data associated with a location within the first coverage area. In some embodiments, the first radar data is received at a first time and the second radar data is received at a second time, with the second time being after the first time. In some embodiments, the first radar data may be received from a first array of one or more sonar elements, and the second radar data may be received from a second array of one or more sonar elements.

At operation 608, the first radar data and the second radar data may be analyzed to identify transient objects and/or fixed objects represented therein. In some embodiments, just transient objects are identified. In other embodiments, only fixed objects are identified. Furthermore, in other embodiments, both transient objects and fixed objects are identified. In some embodiments, objects may be identified as a transient or fixed object by accounting for at least one of a size of a transient object, a speed of the transient object, a direction of the transient object, or a shape of the transient object. Filtering data may include filtering data representing small transient objects that have a size that is smaller than a threshold, and the updated map data may include data representing the fixed objects and large transient objects that have a size that is greater than or equal to the threshold.

At operation 610, initial map data is updated based on the second radar data to form updated map data. In some embodiments, updating the initial map data may include filtering data regarding a transient object out of the updated map data so that the data regarding the transient object is not included in the updated map data. In some embodiments, updating the initial map data may include filtering data regarding all transient objects out so that the data regarding the transient objects is not included in the updated map data. In some embodiments, updating the initial map data may include filtering data so that only objects that have been affirmatively identified as fixed objects are included in the updated map data. In some embodiments, transient objects may be included in the map data, such as based on size of the object, speed of the object (e.g., is the object slow and likely to cause a hazard), and/or based on anticipated timing of the operation (e.g., is the object likely to cause a hazard during the time period anticipated for performing the operation).

In some embodiments, the first radar data may be received at a first time and the second radar data may be received at a second time that is after the first time. Additionally, the updated map data may be updated by utilizing the second radar data at locations where the second radar data is available rather than utilizing the first radar data. However, in some cases, the updated map data may be updated by utilizing both the first radar data and the second radar data in locations where both first radar data and second radar data are available.

At operation 612, a docking operation is generated using the updated map data. The docking operation may entail causing a presentation of a docking view illustrating a representation of the watercraft and a desired docking position. Additionally or alternatively, the docking operation may entail generating one or more navigation instructions for causing the watercraft to be repositioned relative to the desired docking position. In some embodiments, generating one or more navigation instructions for causing the watercraft to be repositioned relative to the desired docking position may include autonomously or semi-autonomously navigating the watercraft to the desired docking position using the one or more navigation instructions. Additionally or alternatively, in some embodiments, generating one or more navigation instructions for causing the watercraft to be repositioned relative to the desired docking position may include providing an instruction on a display with the one or more navigation instructions. The docking operation may be generated using the updated map data and additional data regarding at least one of a water current, a wind speed, a water temperature, an air temperature, or wave roughness, but other types of additional data are also contemplated for use in generating the docking operation.

At operation 614, an image is generated based on the updated map data. Furthermore, the image is caused to be presented on a display at operation 616. At operation 618, a notification is provided, such as with a location where a fender should be deployed based on updated map data. This notification may be presented on a display and may provide a location on the watercraft where the fender should be deployed. Notably, the notification of where to place the fender is just one example of potential notifications or instructions that could be provided in various embodiments of the present invention. Other example notifications include turn 5 degrees port, slow to 2 mph, reverse motor, etc.

Other methods are also contemplated for forming updated map data and using this updated map data to assist in docking the watercraft, with FIG. 7 including a flowchart illustrating another example method 700.

At operation 702, first radar data is received from a radar. The radar may be located on the watercraft, with the radar located at the marine electronic device 560 (see FIG. 5) of the watercraft or at some other location. Additionally, the first radar data is associated with a first coverage area around the watercraft. The radar may be configured to provide radar data for locations provided within a radius of at least five feet from the radar. In some embodiments, the radar may be configured to provide radar data for locations provided within a radius of at least twenty feet from the radar, at least fifty feet from the radar, or other distances. At operation 704, initial map data is generated regarding features of the surrounding environment based on the first radar data.

At operation 706, additional radar data is received from the radar covering a second coverage area. The second coverage area covers one or more locations outside of the first coverage area. In some embodiments, the first radar data is received at a first time and the additional radar data is received at a second time, with the second time being after the first time.

At operation 708, the first radar data and the second radar data are analyzed to identify transient objects and/or fixed objects represented therein. In some embodiments, just transient objects are identified. In other embodiments, only fixed objects are identified. Furthermore, in other embodiments, both transient objects and fixed objects are identified. In some embodiments, objects may be identified as a transient or fixed object by accounting for at least one of a size of a transient object, a speed of the transient object, a direction of the transient object, or a shape of the transient object. Filtering data may include filtering data representing small transient objects that have a size that is smaller than a threshold, and the updated map data may include data representing the fixed objects and large transient objects that have a size that is greater than or equal to the threshold.

At operation 710, expanded map data is generated based on the additional radar data. In some embodiments, generating expanded map data may include filtering data regarding a transient object out of the expanded map data so that the data regarding the transient object is not included in the expanded map data. In some embodiments, generating the expanded map data may include filtering data regarding all transient objects out so that the data regarding the transient objects is not included in the expanded map data. In some embodiments, generating the expanded map data may include filtering data so that only objects that have been affirmatively identified as fixed objects are included in the expanded map data. In some embodiments, transient objects may be included in the map data, such as based on size of the object, speed of the object (e.g., is the object slow and likely to cause a hazard), and/or based on anticipated timing of the operation (e.g., is the object likely to cause a hazard during the time period anticipated for performing the operation).

In some embodiments, the first radar data may be received at a first time and the second radar data may be received at a second time that is after the first time. Additionally, the expanded map data may utilize the second radar data at locations where the second radar data is available rather than utilizing the first radar data. However, in some cases, the expanded map data may utilize both the first radar data and the second radar data in locations where both first radar data and second radar data are available.

At operation 712, a docking operation is generated using the expanded map data. The docking operation may be causing a presentation of a docking view illustrating a representation of the watercraft and a desired docking position. Additionally or alternatively, the docking operation may be generating one or more navigation instructions for causing the watercraft to be repositioned relative to the desired docking position. In some embodiments, generating one or more navigation instructions for causing the watercraft to be repositioned relative to the desired docking position may include autonomously or semi-autonomously navigating the watercraft to the desired docking position using the one or more navigation instructions. Additionally or alternatively, in some embodiments, generating one or more navigation instructions for causing the watercraft to be repositioned relative to the desired docking position may include providing an instruction on a display with the one or more navigation instructions. The docking operation may be generated using the updated map data and additional data regarding at least one of a water current, a wind speed, a water temperature, an air temperature, or wave roughness, but other types of additional data are also contemplated for use in generating the docking operation.

At operation 714, an image is generated based on the expanded map data. At operation 716, the image is caused to be presented on a display. At operation 718, a notification is provided, such as with a location where a fender should be deployed based on the expanded map data. This notification may be presented on a display and may provide a location on the watercraft where the fender should be deployed. Notably, the notification of where to place the fender is just one example of potential notifications or instructions that could be provided in various embodiments of the present invention. Other example notifications include turn 5 degrees port, slow to 2 mph, reverse motor, etc.

In some embodiments, the methods 600 and 700 may be executed by a processor and may be stored as software instructions and/or computer program code in a non-transitory computer readable medium and/or memory. However, the methods may be performed by a wide variety of items. Additionally, the operations of methods 600 and 700 may be performed in various orders, and some of the operations may be performed simultaneously in some embodiments. Some of the operations of methods 600 and 700 may not be performed in some embodiments—for example, in some embodiments, operation 608 may not be performed and first radar data and the second radar data may not be analyzed to identify transient objects and/or fixed objects represented therein. In some embodiments, additional operations may be included in the methods 600 and 700.

FIGS. 6-7 illustrate flowcharts of a system, method, and computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory 520 and executed by, for example, the processor 510. As will be appreciated, any such computer program product may be loaded onto a computer or other programmable apparatus (for example, a marine electronic device 560) to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device (for example, a marine electronic device 560) to cause a series of operations to be performed on the computer or other programmable apparatus to produce a computer-implemented process such that the instructions which execute on the computer or other programmable apparatus implement the functions specified in the flowchart block(s).

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method for forming updated map data regarding a surrounding environment around a watercraft and for using the updated map data to assist in docking the watercraft via one or more processors of a system, wherein the one or more processors are configured to perform the method comprising:
    receiving first radar data from a radar on the watercraft, wherein the first radar data is associated with a first coverage area;
    generating initial map data regarding features of the surrounding environment around the watercraft based on the first radar data;
    receiving second radar data from the radar, wherein the second radar data is different than the first radar data, wherein the second radar data includes radar data associated with a location within the first coverage area, wherein the first radar data is received at a first time, and wherein the second radar data is received at a second time that is after the first time;
    analyzing the first radar data and the second radar data to identify transient objects that are represented therein;
    updating the initial map data based on the second radar data to form the updated map data by filtering data regarding a transient object out of the updated map data so that the data regarding the transient object is not included in the updated map data; and
    generating a docking operation using the updated map data, wherein the docking operation comprises at least one of:
        causing, on a screen of the watercraft, presentation of a docking view illustrating a representation of the watercraft and a desired docking position; or
        generating one or more navigation instructions for causing the watercraft to be repositioned relative to the desired docking position, and either causing one or more motors of the watercraft to operate according to the one or more navigation instructions or causing, on the screen of the watercraft, presentation of the one or more navigation instructions.

2. The method of claim 1, wherein generating one or more navigation instructions for causing the watercraft to be repositioned relative to the desired docking position comprises at least one of:
    autonomously or semi-autonomously navigating the watercraft to the desired docking position using the one or more navigation instructions; or
    providing an instruction on a display with the one or more navigation instructions.

3. The method of claim 1, wherein the filtering data is performed by accounting for at least one of a size of a transient object, a speed of the transient object, a direction of the transient object, or a shape of the transient object.

4. The method of claim 1, wherein the filtering data includes filtering data representing small transient objects that have a size that is smaller than a threshold, wherein the updated map data includes data representing the fixed objects and large transient objects that have a size that is greater than or equal to the threshold.

5. The method of claim 1, wherein the updating the initial map data based on the second radar data to form the updated map data includes filtering data regarding all transient objects out so that the data regarding the transient objects is not included in the updated map data.

6. The method of claim 1, further comprising:
    analyzing the first radar data and the second radar data to identify fixed objects that are represented therein,
    wherein the updated map data includes only data from the first radar data and the second radar data regarding the fixed objects.

7. The method of claim 1, further comprising:
    generating an image based on the updated map data; and
    causing the image to be presented on a display.

8. The method of claim 1, wherein the updated map data is updated by utilizing the second radar data at locations where the second radar data is available rather than utilizing the first radar data.

9. The method of claim 1, wherein the updated map data is updated by utilizing both the first radar data and the second radar data in locations where both first radar data and second radar data are available.

10. The method of claim 1, further comprising:
receiving additional radar data from the radar, wherein the additional radar data covers a second coverage area, wherein the second coverage area covers one or more locations outside of the first coverage area;
generating expanded map data based on the additional radar data; and
generating the docking operation using the expanded map data.

11. The method of claim 1, wherein the docking operation is generated using the updated map data and additional data regarding at least one of a water current, a wind speed, a water temperature, an air temperature, or wave roughness.

12. The method of claim 1, further comprising:
providing a notification with a location where a fender should be deployed based on the updated map data.

13. The method of claim 1, wherein the radar is configured to provide radar data for locations provided within a radius of at least five feet from the radar.

14. A non-transitory computer readable medium having stored thereon software instructions that, when executed by a processor, cause the processor to form updated map data regarding a surrounding environment around a watercraft and to use the updated map data to assist in docking the watercraft by:
receiving first radar data from a radar on the watercraft, wherein the first radar data is associated with a first coverage area;
generating initial map data regarding features of the surrounding environment around the watercraft based on the first radar data;
receiving second radar data from the radar, wherein the second radar data is different than the first radar data, wherein the second radar data includes radar data associated with a location within the first coverage area;
analyze the first radar data and the second radar data to identify one or more transient objects that are represented therein;
updating the initial map data based on the second radar data to form updated map data, wherein updating the initial map data based on the second radar data to form updated map data includes filtering data regarding a transient object out of the updated map data so that the data regarding the transient object is not included in the updated map data; and
generating a docking operation using the updated map data, wherein the docking operation comprises at least one of:
causing, on a screen of the watercraft, presentation of a docking view illustrating a representation of the watercraft and a desired docking position; or
generating one or more navigation instructions for causing the watercraft to be repositioned relative to the desired docking position, and either causing one or more motors of the watercraft to operate according to the one or more navigation instructions or causing, on the screen of the watercraft, presentation of the one or more navigation instructions.

15. The non-transitory computer readable medium of claim 14, wherein generating one or more navigation instructions for causing the watercraft to be repositioned proximate to the desired docking position comprises at least one of:
autonomously or semi-autonomously navigating the watercraft to the desired docking position using the one or more navigation instructions; or
providing an instruction on a display with the one or more navigation instructions.

16. The non-transitory computer readable medium of claim 14, wherein the first radar data is received at a first time, and wherein the second radar data is received at a second time that is after the first time.

17. A system for creation of updated map data regarding a surrounding environment around a watercraft and for use of the updated map data to assist in docking the watercraft, the system comprising:
a radar;
a processor;
a memory including computer program code configured to, when executed, cause the processor to:
receive first radar data from the radar on the watercraft, wherein the first radar data is associated with a first coverage area;
generate initial map data regarding features of the surrounding environment around the watercraft based on the first radar data;
receive second radar data from the radar, wherein the second radar data is different than the first radar data, wherein the second radar data includes radar data associated with a first location within the first coverage area and a second location within a second coverage area outside of the first coverage area;
wherein the first radar data is received at a first time, and wherein the second radar data is received at a second time that is after the first time;
update the initial map data based on the second radar data to form updated map data, wherein the updated map data includes expanded map data so as to additionally cover the second coverage area; and
generate a docking operation using the updated map data covering the first coverage area and the second coverage area, wherein the docking operation comprises at least one of:
causing, on a screen of the watercraft, presentation of a docking view illustrating a representation of the watercraft and a desired docking position; or
generating one or more navigation instructions for causing the watercraft to be repositioned relative to the desired docking position, and either causing one or more motors of the watercraft to operate according to the one or more navigation instructions or causing, on the screen of the watercraft, presentation of the one or more navigation instructions.

* * * * *